US007393121B2

(12) United States Patent
Small

(10) Patent No.: US 7,393,121 B2
(45) Date of Patent: Jul. 1, 2008

(54) LASER GUIDANCE EMERGENCY NAVIGATION METHOD AND SYSTEM

(76) Inventor: Trevor Scott Small, 14455 Marine Dr., White Rock (CA) V4B-1B4

( * ) Notice: Subject to any disclaimer, the term of this patent is extended or adjusted under 35 U.S.C. 154(b) by 0 days.

(21) Appl. No.: 11/656,040

(22) Filed: Jan. 22, 2007

(65) Prior Publication Data

US 2007/0171089 A1 Jul. 26, 2007

Related U.S. Application Data

(60) Provisional application No. 60/760,989, filed on Jan. 23, 2006.

(51) Int. Cl.
*G02B 27/20* (2006.01)

(52) U.S. Cl. ....................... 362/259; 340/331; 340/332; 340/691.4

(58) Field of Classification Search .................. 40/560; 362/259; 340/331, 332, 506, 691.1, 691.4, 340/815.54
See application file for complete search history.

(56) References Cited

U.S. PATENT DOCUMENTS 5,572,183 A * 11/1996 Sweeney .................... 340/332
6,150,943 A * 11/2000 Lehman et al. ............. 362/259
6,481,870 B2 * 11/2002 Son ............................ 362/259

* cited by examiner

*Primary Examiner*—Stephen F. Husar

(57) ABSTRACT

The present invention provides a method and a system for guiding people in an emergency. More specifically, the present invention provides a method and system using a laser for guiding people away from an area of danger, and for guiding emergency personal to an area of danger. The system includes a pair of dissimilar visible laser beams generated by at least one laser emitting device. The system also includes an invisible laser for rescue personnel. The visible dissimilar laser beams are generated substantially parallel to each other to direct evacuees away from an area of danger via the shortest and safest route in the event of an emergency.

8 Claims, 1 Drawing Sheet

LASER GUIDANCE EMERGENCY NAVIGATION METHOD AND SYSTEM

TECHNICAL FIELD

The present invention relates to a method and a system for guiding people in an emergency. More specifically, the present invention relates to a method and system using a laser for guiding people away from an area of danger, and for guiding emergency personal to an area of danger.

BACKGROUND OF THE INVENTION

During an emergency, it is important to evacuate people away from an area of danger as soon as possible. However, if people are not familiar with the area they are in, they can become easily confused and may not be able to find the shortest and safest route away from an area of danger.

In order to assist people in finding a route away from an area of danger, usually signs, such as an exit sign, are used. However, if there is smoke or dust in the atmosphere at the time of the emergency, it is too difficult to see guidance signs. Also, even if the environment is not so smoky, a visually impaired person will still have difficulty seeing a sign.

Also, it is important that emergency personal know how to get to an area of danger as soon as possible. Known guidance signs are only useful in assisting people to get away from an area of danger. Even if emergency personal have a map or knowledge of the area, they still may become lost in a smoky or dusty environment.

The present invention solves the above-mentioned problems and provides a method and system in assisting people to get away from an area of danger more safely and quickly than known systems. Also, the present invention provides a method and system in assisting emergency personnel to reach an area of danger more quickly.

SUMMARY OF THE INVENTION

The present invention achieves the advantage of a method and a system for guiding people in an emergency.

In an aspect of the invention, a laser guidance emergency system includes: a first visible laser emitting device; a second visible laser emitting device; and a mirror, wherein, the first visible laser emitting device emits a visible laser beam of a predetermined shape, the second visible laser emitting device emits a visible laser beam of a predetermined shape different from the first laser beam, and the first visible laser emitting device, the second visible laser emitting device and the mirror are arranged such that the emitted visible laser beams are parallel to each other and are directed to a predetermined destination.

Optionally, the above laser guidance emergency system further includes: an emergency sensor, wherein the laser guidance emergency system is activated if the emergency sensor detects an emergency.

Optionally, in the above laser guidance emergency system, the second visible laser emitting device emits an intermittent laser beam.

Optionally, in the above laser guidance emergency system, the first visible laser emitting device emits a laser beam having a different color from the second visible laser emitting device.

Optionally, in the above laser guidance emergency system, the intermittent laser beam pulses and flows in a waveform manner towards the predetermined destination.

Optionally, the above laser guidance emergency system further includes: an invisible laser emitting device, wherein the invisible laser emitting device is arranged with the mirror such that an invisible laser is directed towards an area of danger.

Optionally, the above laser guidance emergency system further includes; an invisible laser imaging device, wherein, the invisible laser imaging device is used to identify the invisible laser beam.

In another aspect of the present invention, a laser guidance emergency method includes the steps of emitting a first visible laser beam; emitting a second visible laser beam; and directing the first visible laser beam and the second visible laser beam in a parallel manner towards a predetermined destination, wherein, the first visible laser beam has a predetermined shape, and the second visible laser beam has a predetermined shape different from the first laser beam.

Optionally, in the above laser guidance emergency method, the second visible laser is an intermittent laser beam.

Optionally, in the above laser guidance emergency method, the first visible laser has a different color from the second visible laser.

DETAILED DESCRIPTION OF THE PREFERRED EMBODIMENTS

Figure 1:
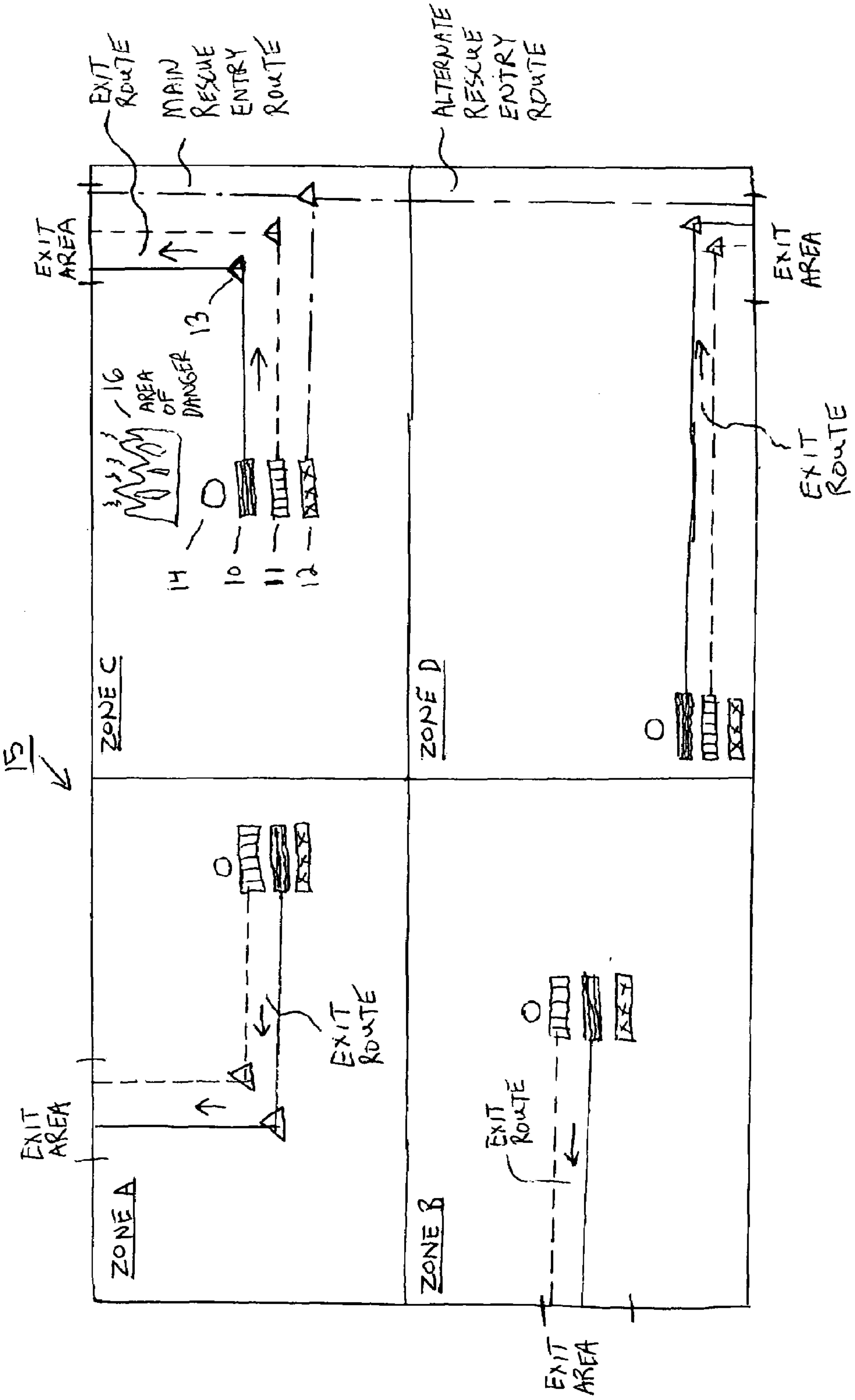
FIG. 1 is an overhead view of the laser guidance emergency system according to the present invention.

Hereinafter, embodiments according to the present invention will be explained with reference to the attached drawings. FIG. 1 an overhead view of the laser guidance emergency system.

The laser guidance emergency system according to the present invention includes a constant visible laser emitting device 10, such as Solid-state laser; an intermittent visible laser emitting device 11, such as a pulsating Solid-state laser; a constant invisible laser emitting device 12, such as an infrared laser; a reflective device 13, such as a mirror; and an emergency sensor 14 such as a smoke detector.

In the present embodiment, the laser guidance emergency system is incorporated into an area 15 including four zones A, B, C and D. Each zone includes the constant visible laser emitting device 10, the intermittent visible laser emitting device 11, the constant invisible laser emitting device 12, the reflective device 13 and the emergency sensor 14.

During an emergency, one of the emergency sensors 14 may be activated, and in this case, the emergency sensor 14 in zone C is activated. The activation of the emergency sensor 14 causes the constant visible laser emitting device 10 and the intermittent visible laser emitting device 11 in each zone to be turned on.

The constant visible laser emitting device 10, the intermittent visible laser emitting device 11 and the reflective device 13 are arranged in a manner such that the constant laser beam and intermittent laser beam are parallel to each other at an equal distance from the ground. The visible intermittent laser beam is on the right and the visible constant laser beam is on the left with respect to a person positioned under the beams facing parallel with the two visible laser beams towards the exit area. With this arrangement, an escaping person can easily find the closest and safest path to the exit by keeping close to the visible laser beams while also keeping the intermittent laser beam to the right hand side. Since one of the laser beams is pulsating, it is easier for a visually impaired person, for example due to the loss of sight or colored-blindness, to distinguish between the two visible laser beams. The pulsating will also attract people who are further away from the exit route.

The visible intermittent emitting laser device 11 may also be set such that the pulsing laser beam flows like waves towards the direction of the safest exit. In order to create the laser waveform, the visible intermittent emitting laser device 11 may be set so as to oscillate up and down. This makes the system more intuitive and easy to use. Even if people have not been instructed properly how to use the visible laser beams, it will feel natural for them to follow the flow of the pulsating laser beam waveform.

In the present embodiment, the constant invisible laser emitting device 12 is used to assist rescue personal in finding an area of danger 16 more quickly. In this case, the constant invisible laser emitting device 12 is arranged close to the emergency sensor 14, and is also aligned with the reflective device 13 to direct an invisible laser beam towards the closest main entry point and an alternate entry point. In this case, an IR laser beam is emitted. Using a laser beam that is invisible to the naked eye reduces the confusion of having evacuating people seeing multiple visible laser beams. Also, having an invisible laser beam only used for rescue personal prevents an evacuee from accidentally following a rescue laser beam directly back to the area of danger 16.

Rescue teams can see the invisible laser beam by using an imaging device such as an IR video camera that can be handheld or mounted on a rescuer's helmet, for example.

Other Embodiments

The present invention is not limited to the above embodiment and a person of ordinary skill in this art would recognize that certain modifications would come within the scope of this invention. Other features include the following.

The two visible laser beams, as long as they are different from each other so as to indicate the direction to the closest exit, may have a different beam shape or consistency, for example, the laser beam may have a thicker shape, be solid, or pulsating. Also, the two visible laser beams may differ from each other by color, for example, one visible laser beam may be red while the other visible laser beam may be green.

Also, the two visible laser devices may be incorporated in an exit sign and directed in a predetermined direction.

The emergency system of the present invention may be used in several environments such as a building, mineshaft, outdoor construction area and the like.

The emergency system of the present invention may also be provided with an audible alarm instructing evacuees how to use the system.

Also, the emergency system of the present invention may be used in combination with a computer processor to determine different modes of operation. For example, a static mode or a dynamic mode may be activated depending on which emergency sensor is activated. The static mode would direct the laser beams such that the shortest and safest regular evacuation route would be indicated. If an emergency sensor that indicated an unusual emergency situation has occurred the emergency system of the present invention could be switched to a dynamic mode. In the dynamic mode; the lasers could be redirected to a new; safer and quicker escape route.

What is claimed is:

1. A laser guidance emergency system comprising:
a first visible laser emitting device;
a second visible laser emitting device; and
a mirror, wherein,
the first visible laser emitting device emits a visible laser beam of a predetermined shape,
the second visible laser emitting device emits a visible laser beam of a predetermined shape different from the first laser beam, and
the first visible laser emitting device, the second visible laser emitting device and the mirror are arranged such that the emitted visible laser beams are parallel to each other and are directed to a predetermined destination and,
the second visible laser emitting device emits an intermittent laser beam.

2. The laser guidance emergency system according to claim 1, further comprising:
an emergency sensor,
wherein the laser guidance emergency system is activated if the emergency sensor detects an emergency.

3. The laser guidance emergency system according to claim 2, wherein the first visible laser emitting device emits a laser beam having a different color from the second visible laser emitting device.

4. The laser guidance emergency system according to claim 1, wherein the intermittent laser beam pulses and flows in a waveform manner towards the predetermined destination.

5. The laser guidance emergency system according to claim 1, further comprising:
an invisible laser emitting device,
wherein the invisible laser emitting device is arranged with the mirror such that an invisible laser is directed towards an area of danger.

6. The laser guidance emergency system according to claim 5, further comprising:
an invisible laser imaging device,
wherein, the invisible laser imaging device is used to identify the invisible laser beam.

7. A laser guidance emergency method comprising the steps of:
emitting a first visible laser beam;
emitting a second visible laser beam; and
directing the first visible laser beam and the second visible laser beam in a parallel manner towards a predetermined destination, wherein,
the first visible laser beam has a predetermined shape,
the second visible laser beam has a predetermined shape different from the first laser beam and
the second visible laser is an intermittent laser beam.

8. The laser guidance emergency method according to claim 7, wherein the first visible laser has a different color from the second visible laser.

* * * * *